US012374834B2

(12) United States Patent
Chang et al.

(10) Patent No.: US 12,374,834 B2
(45) Date of Patent: Jul. 29, 2025

(54) ELECTRICAL PLUG CONNECTOR WITH SHIELDING FEATURES PROVIDING BETTER HIGH-FREQUENCY CHARACTERISTICS

(71) Applicant: Advanced Connectek Inc., New Taipei (TW)

(72) Inventors: Ming-Yung Chang, New Taipei (TW); Jian Bo Luo, New Taipei (TW); Tzu Yao Liao, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 373 days.

(21) Appl. No.: 17/970,540

(22) Filed: Oct. 20, 2022

(65) Prior Publication Data

US 2023/0126454 A1 Apr. 27, 2023

(30) Foreign Application Priority Data

Oct. 21, 2021 (CN) ......................... 202111224076.9

(51) Int. Cl.

*H01R 13/6582* (2011.01)
*H01R 13/6581* (2011.01)
*H01R 13/6583* (2011.01)
*H01R 13/648* (2006.01)
*H01R 13/658* (2011.01)
*H01R 24/60* (2011.01)
*H01R 107/00* (2006.01)

(52) U.S. Cl.

CPC ..... *H01R 13/6582* (2013.01); *H01R 13/6581* (2013.01); *H01R 13/6583* (2013.01); *H01R 13/648* (2013.01); *H01R 13/658* (2013.01); *H01R 24/60* (2013.01); *H01R 2107/00* (2013.01)

(58) Field of Classification Search

CPC ............ H01R 13/6582; H01R 13/6581; H01R 13/6583; H01R 13/648; H01R 13/658; H01R 24/60; H01R 2107/00

See application file for complete search history.

(56) References Cited

U.S. PATENT DOCUMENTS

2018/0026410 A1* 1/2018 Tsai .................. H01R 13/6587 439/607.09

* cited by examiner

*Primary Examiner* — Justin M Kratt
(74) *Attorney, Agent, or Firm* — JCIPRNET

(57) ABSTRACT

An electrical plug connector includes an insulating body, terminals, and a shielding spring member. The terminals include multiple high-speed terminals. Each of the terminals has a docking end to connect to another electrical receptacle connector along an insertion direction. The shielding spring member, partially stacked on the insulating body, includes a sheet-like body, a hollow portion, two first shielding spring fingers, and a second shielding spring finger connected sequentially to form the hollow portion that covers the docking ends of the terminals. The docking end of each of the high-speed terminals relative to an edge between the first shielding spring finger and the hollow portion has a first distance. Each of the docking ends of the remaining terminals relative to an edge between the second shielding spring finger and the hollow portion has a second distance. The first distance is greater than the second distance.

20 Claims, 4 Drawing Sheets

ELECTRICAL PLUG CONNECTOR WITH SHIELDING FEATURES PROVIDING BETTER HIGH-FREQUENCY CHARACTERISTICS

CROSS-REFERENCE TO RELATED APPLICATION

This application claims the priority benefit of China application serial no. 202111224076.9, filed on Oct. 21, 2021. The entirety of the above-mentioned patent application is hereby incorporated by reference herein and made a part of this specification.

BACKGROUND

Technical Field

The disclosure relates to an electrical connector, and more particularly to an electrical plug connector.

Description of Related Art

With the development of science and technology, a variety of connectors for different electronic products emerge as the times require, and the connector for cables is one of the most widely used and popular electrical connectors. Currently, the TYPE-C plug connector connected to the cable is widely used as a connector that may realize positive and negative insertion. However, the shielding spring member structure of the current TYPE-C plug connector is closer to the high-speed transmission terminal, which easily affects the high-frequency characteristics of the TYPE-C plug connector. Moreover, when the current TYPE-C plug connector is connected to another connector, the shielding spring member is easily squeezed and deformed, and has the problem of collapse.

SUMMARY

The disclosure provides an electrical plug connector which has good high-frequency characteristics.

The electrical plug connector of the disclosure includes an insulating body, multiple terminals, and a shielding spring member. The terminals are disposed on the insulating body and include multiple high-speed terminals. Each of the terminals has a docking end to connect to another electrical receptacle connector along an insertion direction. The shielding spring member is partially stacked on the insulating body. The shielding spring member includes a sheet-like body, a hollow portion, two first shielding spring fingers, and a second shielding spring finger. One of the first shielding spring fingers, the sheet-like body, the other first shielding spring finger, and the second shielding spring finger are connected in sequence and in a ring-like shape to form the hollow portion. The hollow portion covers the docking ends of the terminals. The first shielding spring fingers correspond to the high-speed terminals along the insertion direction. The docking end of each of the high-speed terminals relative to an edge between the first shielding spring finger and the hollow portion has a first distance. The second shielding spring finger corresponds to the remaining terminals along the insertion direction. Each of the docking ends of the remaining terminals relative to an edge between the second shielding spring finger and the hollow portion has a second distance. The first distance is greater than the second distance.

The electrical plug connector of the disclosure includes an insulating body, a plurality of terminals, and a shielding spring member. The terminals disposed on the insulating body include a plurality of high-speed terminals, and each of the plurality of terminals has a docking end to connect to another electrical receptacle connector along an insertion direction. The shielding spring member partially stacked on the insulating body includes a sheet-like body, a hollow portion, two first shielding spring fingers, and a second shielding spring finger, wherein one of the first shielding spring fingers, the sheet-like body, the other first shielding spring finger, and the second shielding spring finger are connected sequentially to form the hollow portion. The hollow portion covers each of the docking ends of each of the plurality of terminals, and a first connecting portion of each of the first shielding spring fingers has a notch facing the hollow portion.

Based on the above, in the electrical plug connector of the disclosure, the distance between the shielding spring member and the high-speed terminals may be adjusted by the structural design of the shielding spring member, so that the high-speed terminals relative to the remaining terminals are farther away from the shielding spring member to prevent the high-speed terminals from being too close to the shielding spring member, thereby affecting the high-frequency characteristics of the electrical plug connector. Thus, compared with the structural relationship between the shielding spring member and the high-speed terminals in a conventional electrical plug connector, the shielding spring member of the electrical plug connector of the disclosure is farther away from the high-speed terminals and has good high-frequency characteristics.

DESCRIPTION OF THE EMBODIMENTS

Figure 1:
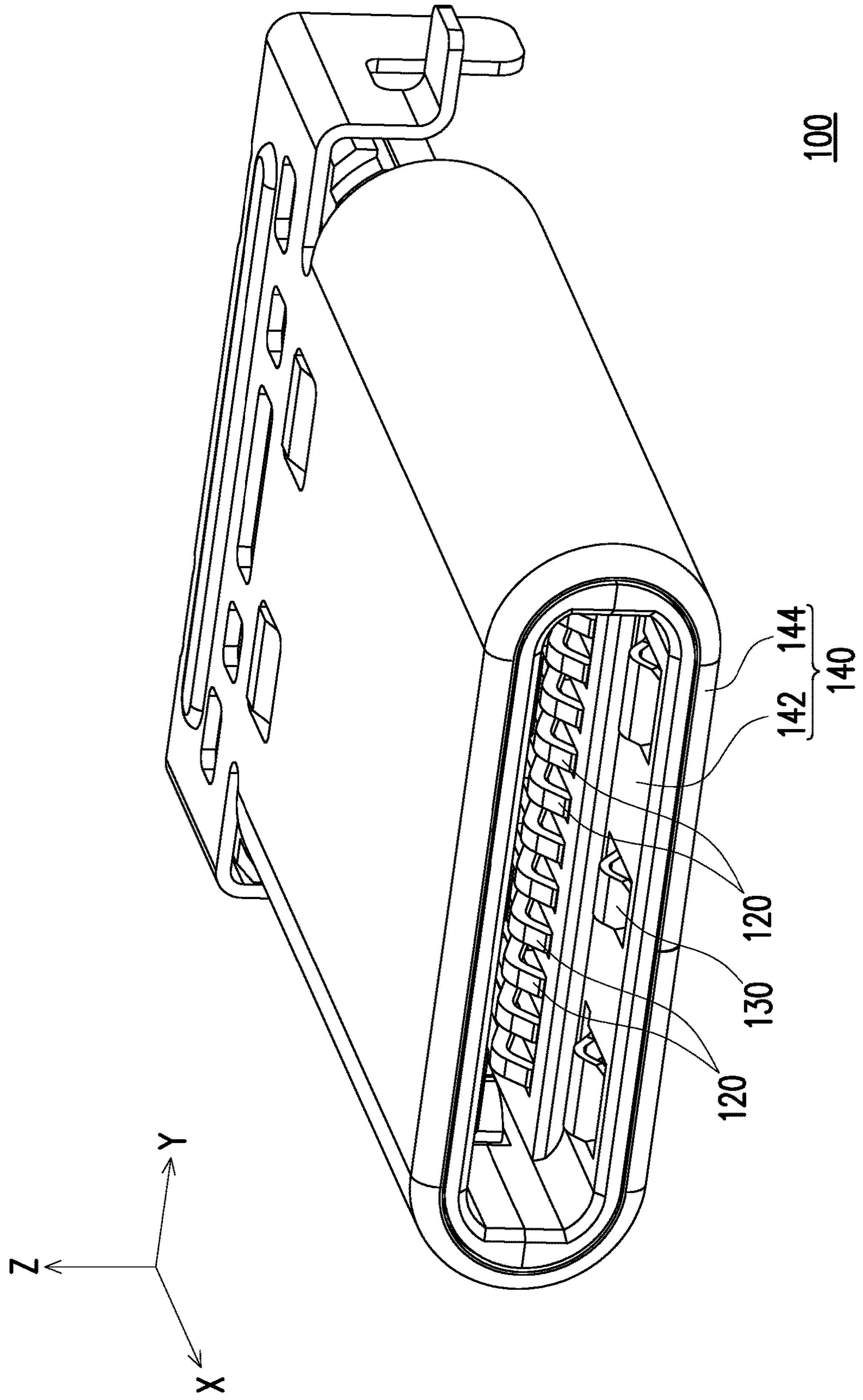
FIG. 1 is a schematic diagram of an electrical plug connector according to an embodiment of the disclosure.

FIG. 1 is a schematic diagram of an electrical plug connector according to an embodiment of the disclosure. At the same time, the rectangular coordinates X, Y, and Z are provided to facilitate the related description and reference of subsequent components. Referring to FIG. 1, an electrical plug connector 100 of the embodiment is, for example, a TYPE-C plug connector connected to cables, and is adapted for connecting with another electrical receptacle connector (not shown) along an insertion direction (i.e., along the X axial direction).

Figure 2:
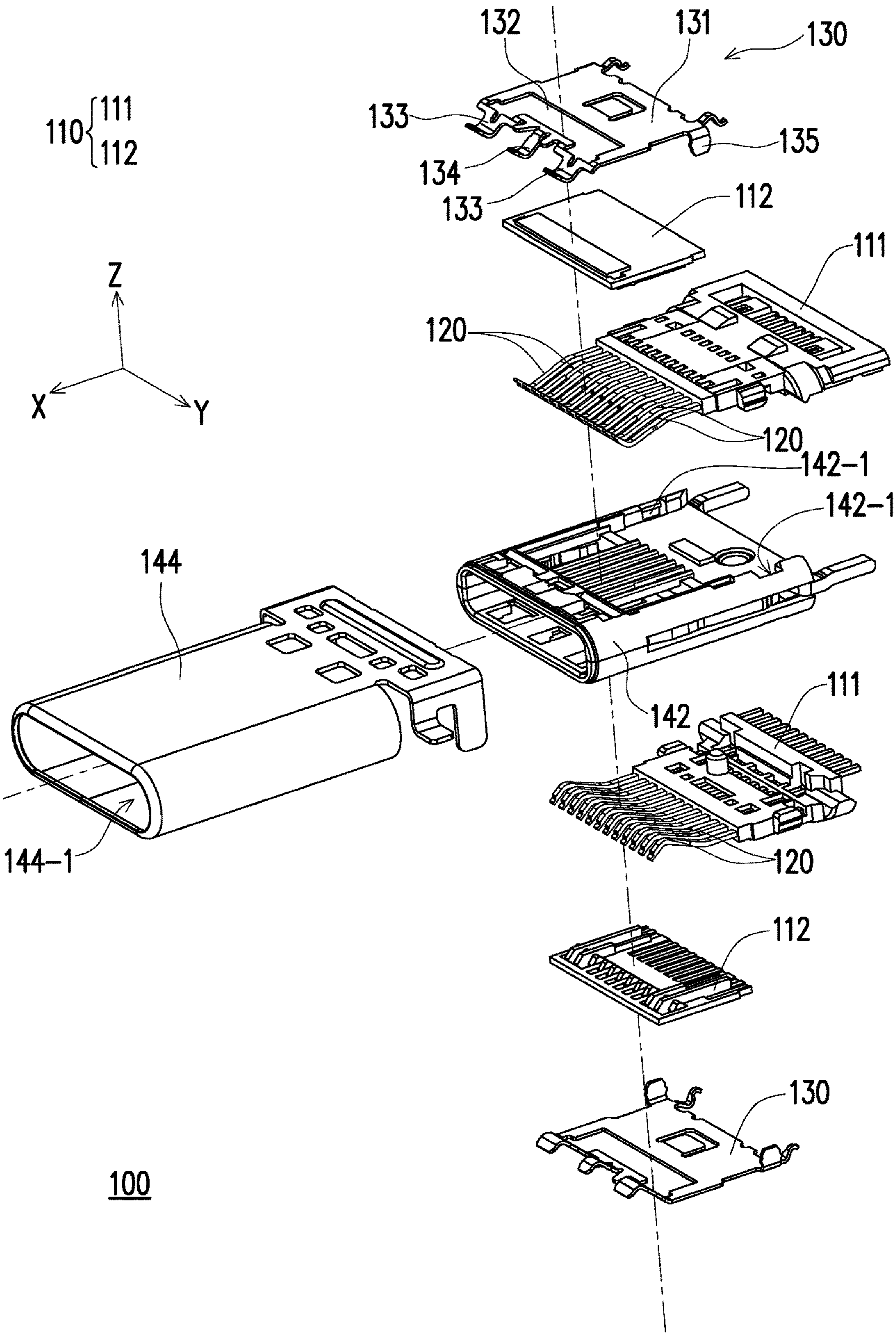
FIG. 2 is a partial exploded view of the electrical plug connector of FIG. 1.

FIG. 2 is a partial exploded view of the electrical plug connector of FIG. 1. Referring to FIGS. 1 and 2, in the embodiment, the electrical plug connector 100 includes two insulating bodies 110, multiple terminals 120, two shielding spring members 130, and a shell 140. The terminals 120 are respectively disposed on the two insulating bodies 110 and extended along the X axial direction, and each of the shielding spring members 130 is partially stacked on the corresponding insulating body 110 along the Z axial direction. The shell 140 includes an inner shell 142 and an outer shell 144. In detail, in the embodiment, the multiple terminals 120 are divided into two sets of terminals. The insulating body 110 includes an upper first part 111, a lower first part 111, an upper second part 112 and a lower second part 112. During the manufacturing process of the electrical plug connector 100, the upper first part 111 is combined with one set of the terminals 120 to form an upper terminal module and the lower first part 111 is combined with the other set of the terminals 120 to form a lower terminal module. In the embodiment, the first part 111 and the terminals 120 are combined by, for example, insert molding, but are not limited thereto. The upper terminal module is stacked on a concave region of an upper surface of the inner shell 142 along the Z axial direction and the lower terminal module is stacked on a concave region of a lower surface of the inner shell 142 along the Z axial direction. The upper second part 112 is sandwiched between the corresponding terminals 120 and the corresponding shielding spring member 130. The lower second part 112 is sandwiched between the corresponding terminals 120 and the corresponding shielding spring member 130. In other embodiments, the first part 111 and the second part 112 may be integrally formed structures.

The insulating body 110, the two sets of terminals 120, and the shielding spring members 130 are disposed on the inner shell 142 along the Z axial direction, and an accommodating space 144-1 of the outer shell 144 accommodates the insulating body 110, the terminals 120, the shielding spring members 130, and the inner shell 142.

Figure 3:
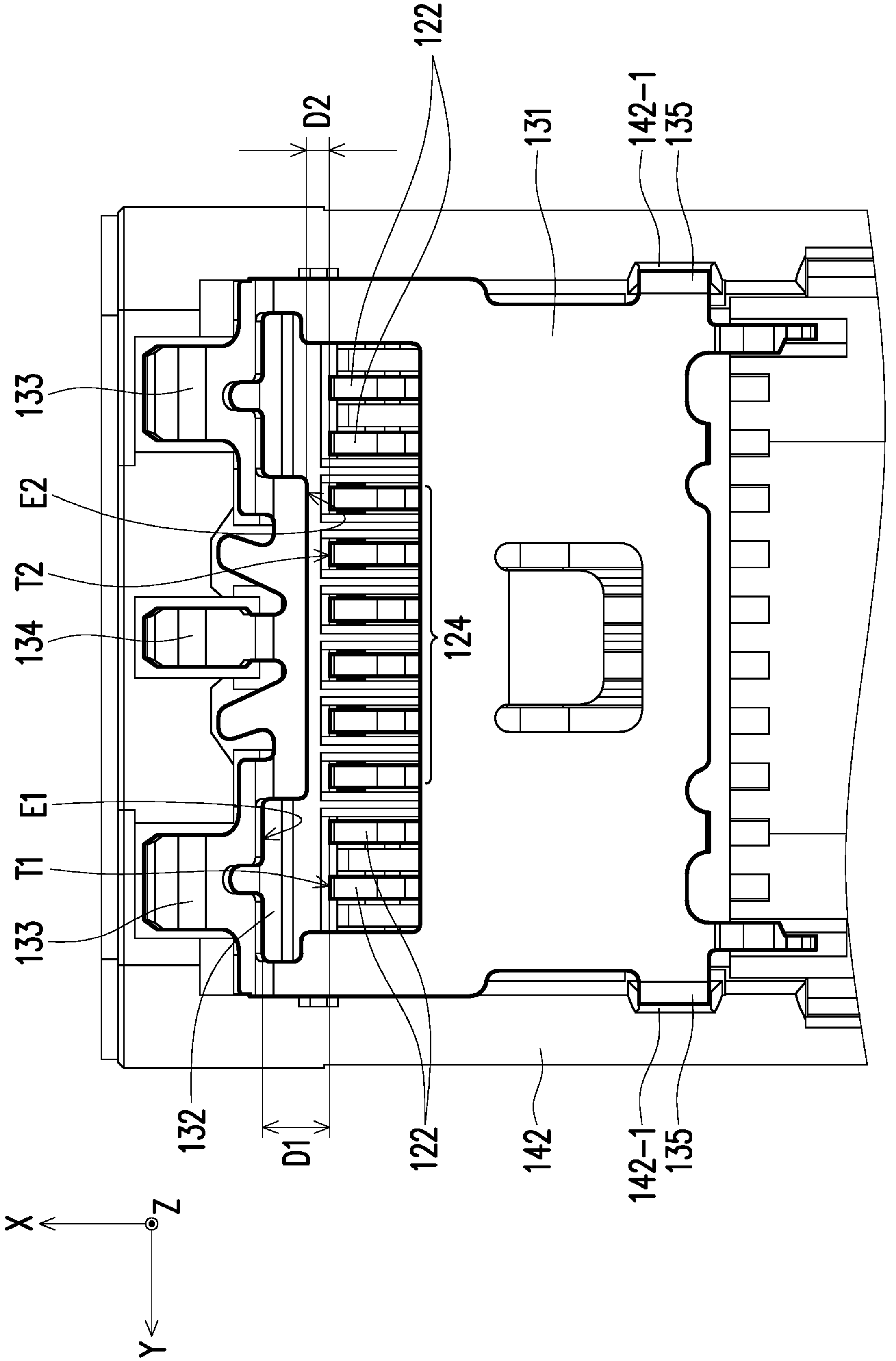
FIG. 3 is a partial enlarged top view of a partial component of the electrical plug connector of FIG. 1.
Figure 4:
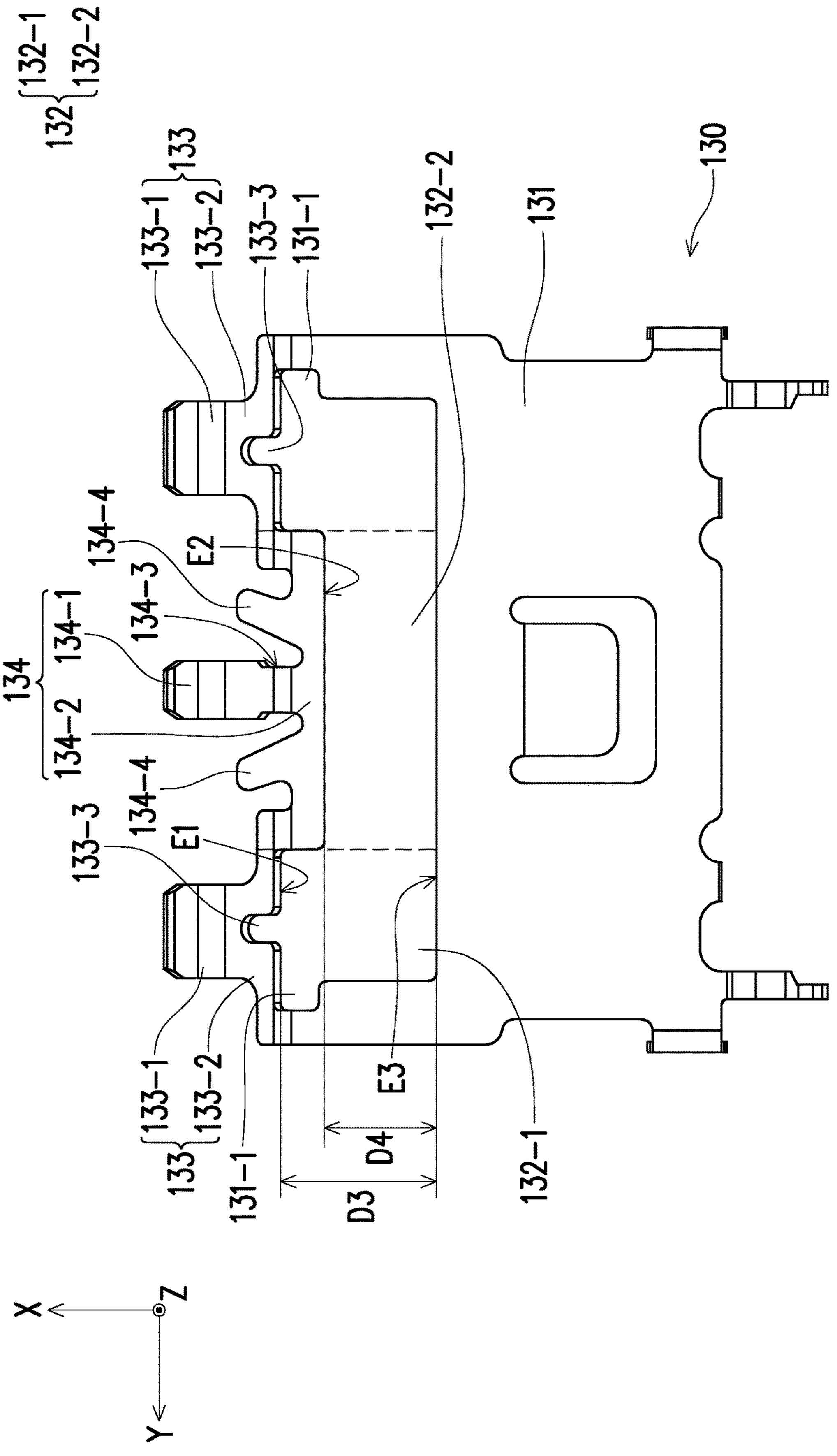
FIG. 4 is a top view of a shielding spring member of the electrical plug connector of FIG. 1.

FIG. 3 is a partial enlarged top view of a partial component of the electrical plug connector of FIG. 1. FIG. 4 is a top view of a shielding spring member of the electrical plug connector of FIG. 1. It should be noted that, in order to clearly illustrate the structural relationship of the electrical plug connector 100, FIG. 3 only shows the terminals 120, the shielding spring member 130, and the inner shell 142 of the shell 140. Referring to FIG. 3, in the embodiment, the terminals 120 include multiple high-speed terminals 122, namely, SuperSpeed differential signal #1 (TX1+, TX1−, RX1+, and RX1−) and SuperSpeed differential signal #2 (TX2+, TX2−, RX2+, and RX2−). The high-speed terminals 122 have docking ends T1, and the remaining terminals 124 (non-high-speed terminals) have docking ends T2. The docking ends T1 of the high-speed terminals 122 and the docking ends T2 of the remaining terminals 124 are adapted for connecting with another electrical receptacle connector (not shown) along the insertion direction (i.e., along the X axial direction).

It should be noted here that the high-speed terminals 122 and the remaining terminals 124 are arranged along an arrangement axial direction (i.e., along the Y axial direction), and the docking ends T1 of the high-speed terminals 122 and the docking ends T2 of the remaining terminals 124 are flush in the arrangement axial direction (i.e., the Y axial direction). In addition, ground terminals shielded by other components in FIG. 3 also belong to the remaining terminals 124.

Referring to FIG. 4, in the embodiment, each of the shielding spring members 130 includes a sheet-like body 131, a hollow portion 132, two first shielding spring fingers 133, and a second shielding spring finger 134. The two first shielding spring fingers 133 and the second shielding spring finger 134 are arranged along the arrangement axial direction (i.e., along the Y axial direction), and one of the first shielding spring fingers 133, the sheet-like body 131, the other first shielding spring finger 133, and the second shielding spring finger 134 are connected sequentially to form the hollow portion 132. Here, the sheet-like body 131, the two first shielding spring fingers 133, and the second shielding spring finger 134 are, for example, integrally formed structures, but are not limited thereto.

In detail, please refer to FIG. 3. In the embodiment, the hollow portion 132 covers the docking ends T1 and T2 of the terminals 120 along the Z axial direction. The first shielding spring fingers 133 correspond to the high-speed terminals 122 along the insertion direction (i.e., the X axial direction), and the second shielding spring finger 134 corresponds to the remaining terminals 124 along the insertion direction (i.e., the X axial direction). The docking end T1 of each of the high-speed terminals 122 relative to an edge E1 between the first shielding spring finger 133 and the hollow portion 132 has a first distance D1, and each of the docking ends T2 of the remaining terminals 124 relative to an edge E2 between the second shielding spring finger 134 and the hollow portion 132 has a second distance D2. Moreover, the first distance D1 is greater than the second distance D2.

In other words, in the embodiment, the sheet-like body 131 is located on the XY plane, and the hollow portion 132 orthographically projected on the XY plane covers the docking ends T1 and T2 of the terminals 120 orthographically projected on the XY plane. In this way, the first distance D1 between the docking end T1 of each of the high-speed terminals 122 orthographically projected on the XY plane and the edge E1 between the first shielding spring finger 133 orthographically projected on the XY plane and the hollow portion 132 is greater than the second distance D2 between each of the docking ends T2 of the remaining terminals 124 orthographically projected on the XY plane and the edge E2 between the second shielding spring finger 134 orthographically projected on the XY plane and the hollow portion 132.

In more detail, please refer to FIGS. 3 and 4 at the same time. In the embodiment, the hollow portion 132 is divided into a first area 132-1 and a second area 132-2. The first area 132-1 is adjacent between the first shielding spring finger 133 and the sheet-like body 131 along the insertion direction (i.e., along the X axial direction), and the second area 132-2 is adjacent between the second shielding spring finger 134 and the sheet-like body 131 along the insertion direction (i.e., along the X axial direction). The first area 132-1 and the second area 132-2 cover the docking ends T1 of the high-speed terminals 122 and the docking ends T2 of the remaining terminals 124, respectively, along the Z axial direction. Moreover, the dimension of the first area 132-1 along the insertion direction (i.e., along the X axial direction) is larger than the dimension of the second area 132-2 along the insertion direction (i.e., along the X axial direction).

That is, as shown in FIG. 4, in the insertion direction (i.e., the X axial direction), an edge E3 between the sheet-like body 131 and the hollow portion 132 relative to the edge E1 between the first shielding spring finger 133 and the hollow portion 132 has a third distance D3, and the edge E3 between the sheet-like body 131 and the hollow portion 132 relative to the edge E2 between the second shielding spring finger 134 and the hollow portion 132 has a fourth distance D4. Moreover, the third distance D3 is greater than the fourth distance D4.

Therefore, in the embodiment, the electrical plug connector 100 may adjust the distance between the shielding spring member 130 and the high-speed terminal 122 by the structural design of the shielding spring member 130, so as to prevent the high-speed terminal 122 from being too close the shielding spring member 130, thereby affecting the high-frequency characteristics of the electrical plug connector 100. Thus, compared with the structural relationship between the shielding spring member and the high-speed terminals in the conventional electrical plug connector, the shielding spring member 130 of the electrical plug connector 100 of the embodiment is farther away from the high-speed terminals 122 and has good high-frequency characteristics.

In addition, please refer to FIGS. 2 and 3. In the embodiment, the shielding spring member 130 further has two positioning portions 135 that are vertically connected to the sheet-like body 131 along the Z axial direction, and the inner shell 142 of the shell 140 further has two locating slots 142-1 corresponding to the two positioning portions 135, respectively. Each of the positioning portions 135 is fitted into the corresponding locating slot 142-1 to limit the movement of the shielding spring member 130 in the insertion direction (i.e., the X axial direction) and the arrangement axial direction (i.e., along the Y axial direction).

The shielding spring member 130 is further described below.

Referring to FIG. 4, in the embodiment, each of the first shielding spring fingers 133 has a first elastic piece portion 133-1 and a first connecting portion 133-2, and the first elastic piece portion 133-1 relative to the hollow portion 132 is connected to the first connecting portion 133-2 along the insertion direction (i.e., the X axial direction). The second shielding spring finger 134 has a second elastic piece portion 134-1 and a second connecting portion 134-2, and the second elastic piece portion 134-1 relative to the hollow portion 132 is connected to the second connecting portion 134-2 along the insertion direction (i.e., the X axial direction). The second connecting portion 134-2 of the second shielding spring finger 134 is connected between the two first connecting portions 133-2 of the two first shielding spring fingers 133, and the first connecting portion 133-2 of one of the first shielding spring fingers 133, the sheet-like body 131, the first connecting portion 133-2 of the other first shielding spring finger 133, and the second connecting portion 134-2 of the second shielding spring finger 134 are connected sequentially to form the hollow portion 132.

In detail, in the embodiment, the sheet-like body 131 has two recesses 131-1 facing the hollow portion 132 and adjacent to the two first connecting portions 133-2, respectively, and the first connecting portion 133-2 of each of the first shielding spring fingers 133 has a notch 133-3 facing the hollow portion 132. The second elastic piece portion 134-1 of the second shielding spring finger 134 has a necking profile 134-3 near the second connecting portion 134-2, and the second shielding spring finger 134 further has two protruding portions 134-4 respectively extending from the second connecting portion 134-2 away from the hollow portion 132 and gradually moving away from the second elastic piece portion 134-1.

As mentioned above, the sheet-like body 131 and the two first shielding spring fingers 133 are designed to have the recesses 131-1 and the notches 133-3, so that the structures of the two first shielding spring fingers 133 are weakened, and the two first shielding spring fingers 133 have better elasticity. In addition, the second elastic piece portion 134-1 and the second connecting portion 134-2 of the second shielding spring finger 134 are designed to have the necking profile 134-3 and the two protruding portions 134-4, respectively, so that the structure of the second elastic piece portion 134-1 of the second shielding spring finger 134 is weakened, and the stress of the second connecting portion 134-2 can be dispersed in the two protruding portions 134-4, thereby enabling the two first shielding spring fingers 133 to have better elasticity and be less susceptible to deformation. In this way, the two first shielding spring fingers 133 and the second shielding spring finger 134 may be prevented from collapse caused by being squeezed and deformed when the electrical plug connector 100 is connected to another electrical receptacle connector (not shown). Therefore, the reliability of the electrical plug connector 100 may be improved, and the service life of the electrical plug connector 100 may be increased.

In summary, in the electrical plug connector of the disclosure, the distance between the shielding spring member and the high-speed terminals may be adjusted by the structural design of the shielding spring member, so that the high-speed terminals relative to the remaining terminals are farther away from the shielding spring member to prevent the high-speed terminals from being too close to the shielding spring member, thereby affecting the high-frequency characteristics of the electrical plug connector. Thus, compared with the structural relationship between the shielding spring member and the high-speed terminals in the conventional electrical plug connector, the shielding spring member of the electrical plug connector of the disclosure is farther away from the high-speed terminals and has good high-frequency characteristics. In addition, the shielding spring member also increases the size of the connection structure of the shielding spring finger relative to the sheet-like body, equivalent to increasing the force arm of the shielding spring finger, so that when the electrical plug connector is connected to another electrical receptacle connector, the collapse of the shielding spring finger may be avoided due to the improvement of the force arm.

What is claimed is:

1. An electrical plug connector, comprising:

an insulating body;

a plurality of terminals, disposed on the insulating body and comprising a plurality of high-speed terminals, and each of the plurality of terminals has a docking end to connect to another electrical receptacle connector along an insertion direction; and a shielding spring member, partially stacked on the insulating body, and the shielding spring member comprising a sheet-like body, a hollow portion, two first shielding spring fingers, and a second shielding spring finger, wherein one of the first shielding spring fingers, the sheet-like body, the other first shielding spring finger, and the second shielding spring finger are connected sequentially to form the hollow portion, and the hollow portion covers each of the docking ends of each of the plurality of terminals, wherein each of the first shielding spring fingers corresponds to each of the high-speed terminals along the insertion direction, and the docking end of each of the high-speed terminals relative to an edge between the first shielding spring finger and the hollow portion has a first distance, wherein the second shielding spring finger corresponds to each of the remaining terminals along the insertion direction, each of the docking ends of each of the remaining terminals relative to an edge between the second shielding spring finger and the hollow portion has a second distance, and the first distance is greater than the second distance.

2. The electrical plug connector according to claim 1, wherein each of the first shielding spring fingers has a first elastic piece portion and a first connecting portion, the first elastic piece portion is connected to the first connecting portion along the insertion direction, and the first connecting portion is connected between the second shielding spring finger and the sheet-like body.

3. The electrical plug connector according to claim 2, wherein the second shielding spring finger has a second elastic piece portion and a second connecting portion, the second elastic piece portion is connected to the second connecting portion along the insertion direction, and the second connecting portion is connected between the two first connecting portions of the two first shielding spring fingers.

4. The electrical plug connector according to claim 3, wherein the second elastic piece portion has a necking profile near the second connecting portion.

5. The electrical plug connector according to claim 3, wherein the second shielding spring finger further has two protruding portions, respectively extending from the second connecting portion away from the hollow portion and gradually moving away from the second elastic piece portion.

6. The electrical plug connector according to claim 2, wherein the first connecting portion of each of the first shielding spring fingers has a notch facing the hollow portion.

7. The electrical plug connector according to claim 1, wherein in the insertion direction, the edge between the sheet-like body and the hollow portion relative to an edge between the first shielding spring finger and the hollow portion has a third distance, the edge between the sheet-like body and the hollow portion relative to an edge between the second shielding spring finger and the hollow portion has a fourth distance, and the third distance is greater than the fourth distance.

8. The electrical plug connector according to claim 1, wherein the hollow portion is divided into a first area and a second area, the first area is adjacent between the first shielding spring finger and the sheet-like body along the insertion direction, the second area is adjacent between the second shielding spring finger and the sheet-like body along the insertion direction, and a dimension of the first area along the insertion direction is larger than a dimension of the second area along the insertion direction.

9. The electrical plug connector according to claim 1, further comprising:

a shell, having a locating slot and an accommodating space, the shielding spring member having a positioning portion vertically connected to the sheet-like body, the positioning portion fitted into the locating slot of the shell, and the accommodating space of the shell accommodating the insulating body, each of the plurality of terminals, and the shielding spring member.

10. The electrical plug connector according to claim 1, wherein the sheet-like body is located on a plane, a distance between the docking end of each of the high-speed terminals orthographically projected on the plane and the edge between the first shielding spring finger orthographically projected on the plane and the hollow portion is greater than a distance between each of the docking ends of each of the remaining terminals orthographically projected on the plane and the edge between the second shielding spring finger orthographically projected on the plane and the hollow portion.

11. An electrical plug connector, comprising:

an insulating body;

a plurality of terminals, disposed on the insulating body and comprising a plurality of high-speed terminals, and each of the plurality of terminals has a docking end to connect to another electrical receptacle connector along an insertion direction; and a shielding spring member, partially stacked on the insulating body, and the shielding spring member comprising a sheet-like body, a hollow portion, two first shielding spring fingers, and a second shielding spring finger, wherein one of the first shielding spring fingers, the sheet-like body, the other first shielding spring finger, and the second shielding spring finger are connected sequentially to form the hollow portion, the hollow portion covers each of the docking ends of each of the plurality of terminals, and a first connecting portion of each of the first shielding spring fingers has a notch facing the hollow portion, wherein the first shielding spring fingers and the second shielding spring finger are arranged at a same side and opposite to the sheet-like body across the hollow portion, and the notch of each of the first shielding spring fingers is extended from an interior of the first shielding spring finger toward the hollow portion till communicated to the hollow portion so as to weaken a structure of the first shielding spring finger to achieve elasticity of the structure.

12. The electrical plug connector according to claim 11, wherein each of the first shielding spring fingers corresponds to each of the high-speed terminals along the insertion direction, and the docking end of each of the high-speed terminals relative to an edge between the first shielding spring finger and the hollow portion has a first distance, wherein the second shielding spring finger corresponds to each of the remaining terminals along the insertion direction, and each of the docking ends of each of the remaining terminals relative to an edge between the second shielding spring finger and the hollow portion has a second distance, wherein the first distance is greater than the second distance.

13. The electrical plug connector according to claim 11, wherein each of the first shielding spring fingers has a first elastic piece portion and the first connecting portion, the first elastic piece portion is connected to the first connecting portion along the insertion direction, and the first connecting portion is connected between the second shielding spring finger and the sheet-like body.

14. The electrical plug connector according to claim 13, wherein the second shielding spring finger has a second elastic piece portion and a second connecting portion, the second elastic piece portion is connected to the second connecting portion along the insertion direction, and the second connecting portion is connected between the two first connecting portions of the two first shielding spring fingers.

15. The electrical plug connector according to claim 14, wherein the second elastic piece portion has a necking profile near the second connecting portion.

16. The electrical plug connector according to claim 14, wherein the second shielding spring finger further has two protruding portions, respectively extending from the second connecting portion away from the hollow portion and gradually moving away from the second elastic piece portion.

17. The electrical plug connector according to claim 12, wherein in the insertion direction, the edge between the sheet-like body and the hollow portion relative to an edge between the first shielding spring finger and the hollow portion has a third distance, the edge between the sheet-like body and the hollow portion relative to an edge between the second shielding spring finger and the hollow portion has a fourth distance, and the third distance is greater than the fourth distance.

18. The electrical plug connector according to claim 11, further comprising:

a shell, having a locating slot and an accommodating space, the shielding spring member having a positioning portion vertically connected to the sheet-like body, the positioning portion fitted into the locating slot of the shell, and the accommodating space of the shell accommodating the insulating body, each of the plurality of terminals, and the shielding spring member.

19. The electrical plug connector according to claim 12, wherein the sheet-like body is located on a plane, a distance between the docking end of each of the high-speed terminals orthographically projected on the plane and the edge between the first shielding spring finger orthographically projected on the plane and the hollow portion is greater than a distance between each of the docking ends of each of the remaining terminals orthographically projected on the plane and the edge between the second shielding spring finger orthographically projected on the plane and the hollow portion.

20. An electrical plug connector, comprising:

an insulating body;

a plurality of terminals, disposed on the insulating body and comprising a plurality of high-speed terminals, and each of the plurality of terminals has a docking end to connect to another electrical receptacle connector along an insertion direction; and a shielding spring member, partially stacked on the insulating body, and the shielding spring member comprising a sheet-like body, a hollow portion, two first shielding spring fingers, and a second shielding spring finger, wherein one of the first shielding spring fingers, the sheet-like body, the other first shielding spring finger, and the second shielding spring finger are connected sequentially to form the hollow portion, the hollow portion covers each of the docking ends of each of the plurality of terminals, and a first connecting portion of each of the first shielding spring fingers has a notch facing the hollow portion, wherein the hollow portion is divided into a first area and a second area, the first area is adjacent between a first edge of the first shielding spring finger and a third edge of the sheet-like body along the insertion direction, the second area is adjacent between a second edge of the second shielding spring finger and the third edge of the sheet-like body along the insertion direction, wherein the first edge of the first shielding spring finger and the second edge of the second shielding spring finger are arranged front and back along the insertion direction, and a dimension of the first area along the insertion direction is larger than a dimension of the second area along the insertion direction.

* * * * *